(12) United States Patent
Doshi et al.

(10) Patent No.: US 8,577,835 B2
(45) Date of Patent: Nov. 5, 2013

(54) METHOD AND SYSTEM FOR SHARING DATA BETWEEN SUBSCRIBERS OF A MULTI-TENANT DATABASE SERVICE

(75) Inventors: Kedar Doshi, Palo Alto, CA (US); Aditya Kuruganti, San Francisco, CA (US); Chaitanya Bhatt, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 385 days.

(21) Appl. No.: 12/145,325

(22) Filed: Jun. 24, 2008

(65) Prior Publication Data

US 2009/0030906 A1  Jan. 29, 2009

Related U.S. Application Data

(60) Provisional application No. 60/946,951, filed on Jun. 28, 2007.

(51) Int. Cl.
*G06F 7/00* (2006.01)

(52) U.S. Cl.
USPC .......................................... 707/608

(58) Field of Classification Search
USPC ................... 707/608, 622, 999.009
See application file for complete search history.

(56) References Cited

U.S. PATENT DOCUMENTS

| | | | |
|---|---|---|---|
| 7,047,276 B2 * | 5/2006 | Liu et al. ................. 709/201 |
| 7,221,942 B2 * | 5/2007 | Jung et al. ............. 455/435.1 |
| 7,373,108 B2 * | 5/2008 | Vidaillac .................. 455/41.2 |
| 7,590,564 B1 * | 9/2009 | Ward et al. ................ 705/26.1 |
| 7,630,986 B1 * | 12/2009 | Herz et al. ...................... 1/1 |
| 7,664,861 B2 * | 2/2010 | Guntupalli et al. ........ 709/227 |
| 7,707,222 B2 * | 4/2010 | Manno ...................... 707/781 |
| 2003/0055880 A1 * | 3/2003 | Liu et al. .................. 709/203 |
| 2005/0132221 A1 * | 6/2005 | Marcjan .................... 713/201 |
| 2005/0210500 A1 * | 9/2005 | Stone .......................... 725/31 |
| 2005/0215252 A1 * | 9/2005 | Jung et al. .............. 455/435.1 |
| 2005/0223022 A1 * | 10/2005 | Weissman et al. ......... 707/102 |
| 2006/0161554 A1 | 7/2006 | Lucovsky et al. ............. 707/10 |
| 2006/0168043 A1 * | 7/2006 | Eisenberger et al. ...... 709/206 |
| 2007/0088741 A1 | 4/2007 | Brooks et al. .......... 707/103 R |
| 2007/0168958 A1 * | 7/2007 | Huang et al. ................. 717/120 |
| 2008/0244184 A1 * | 10/2008 | Lewis et al. ................ 711/130 |

OTHER PUBLICATIONS

International Search Report and Written Opinion from PCT Application No. PCT/US08/08108 mailed on Oct. 1, 2008.
U.S. Appl. No. 60/828,192, filed Oct. 4, 2006.
U.S. Appl. No. 10/817,161, filed Apr. 2, 2004.
Supplementary European Search Report from European Patent Application No. 08779873, dated Oct. 1, 2010.

* cited by examiner

*Primary Examiner* — Mohammed R Uddin
(74) *Attorney, Agent, or Firm* — Haynes Beffel Wolfeld LLP; Ernest J. Beffel, Jr.

(57) ABSTRACT

In accordance with embodiments, there are provided mechanisms and methods for sharing data among subscribers of a multi-tenant database service. These mechanisms and methods for sharing data among subscribers of a multi-tenant database service can enable embodiments to providing controlled, limited sharing between the subscribers regardless of the physical location of the subscriber data. The ability of embodiments to provide such additional sharing capabilities may lead to more secure sharing of data within a multi-tenant on-demand database service.

26 Claims, 11 Drawing Sheets

300

New Invitation                                       Help for this Page (?)

Save & Send Invite    Cancel

Connect to...                                    | = Required Information

Contact  | Geoff Minor          | 🔍

Account  | Company B            | 🔍

Our company is represented by...

Connection | Admin User           | 🔍
       Owner

Publish these lead fields...

☑ Company        ☑ First Name       ☐ Salutation

| Publish these lead fields... | | |
|---|---|---|
| ☑ Company | ☑ First Name | ☐ Salutation |
| ☑ Last Name | ☐ Industry | ☑ State/Province |
| ☐ Annual Revenue | ☐ Lead Source | ☑ Street |
| ☑ City | ☐ Lead Status | ☑ Title |
| ☐ Country | ☑ No. of Employees | ☐ Unread by Owner |
| ☐ Description | ☑ Phone | ☐ Website |
| ☑ Email | ☑ Rating | ☑ Zip/Postal Code |

[ Save & Send Invite ]  [ Cancel ]

All Leads from Connections  Help for this Page (?)

View: [All Leads from Connections ▼]  Create New View

A | B | C | D | E | F | G | H | I | J | K | L | M | N | O | P | Q | R | S | T | U | V | W | X | Y | Z | Other | All

[Accept]  [Accept & Change Owner]

☑ Connection Name △    Title    Source    Industry    State    Sent Date
☑ 148wm3.com           CEO                                     6/18/2007 4:58 PM

[Accept]  [Accept & Change Owner]

A | B | C | D | E | F | G | H | I | J | K | L | M | N | O | P | Q | R | S | T | U | V | W | X | Y | Z | Other | All

---

Lead
Frank Geary    Printable View | Customize Page | Help for this Page (?)

< Back to List: Leads from Connections

This lead is externally shared. Received from 148wm3.com (6/18/2007).

Open Activities [0] | Activity History [0] | HTML Email Status [0]

Lead Detail   [Edit] [Delete] [Convert] [Clone] [Sharing] [Find Duplicates]

Lead Owner  Admin User [Change]          Lead Status  Open
      Name  Frank Geary                       Phone   (415) 555-1212
   Company  Architecture Inc                   Email
     Title  CEO                               Rating   Warm ▽ Address Information
   Address                                   Website ▽ Additional Information
   No. of Employees                          Lead Source
   Annual Revenue                            Industry
   Description
   Created By  Admin User, 6/18/2007 5:04 PM   Last Modified By  Connection User, 6/18/2007 5:04 PM

Custom Links
       Google Search    Google Maps    Send Gmail
       Google News      Hoovers Profile

[Edit] [Delete] [Convert] [Clone] [Sharing] [Find Duplicates]

350 ions and methods for sharing data among subscribers of a multi-tenant database (or other) service. These mechanisms and methods for sharing data among subscribers of a multi-tenant database service can enable embodiments to providing controlled, limited or full sharing between the subscribers regardless of the physical location of the subscriber data. The ability of embodiments to provide such sharing capabilities may lead to more secure sharing of data within a multi-tenant on-demand database service.

METHOD AND SYSTEM FOR SHARING DATA BETWEEN SUBSCRIBERS OF A MULTI-TENANT DATABASE SERVICE

CLAIM OF PRIORITY

This application claims the benefit of U.S. Provisional Patent Application 60/946,951 entitled "METHOD AND SYSTEM FOR SHARING DATA BETWEEN SUBSCRIBERS TO AN ON DEMAND SERVICE," by Kedar Doshi, filed Jun. 28, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to sharing data in the context of database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to share data among various users of the aforementioned database systems. For example, companies may merge, form partnerships or enter into supplier or vendor agreements that could be facilitated by sharing one another's data. Moreover, there is a desire to share data securely. For example, there may be a desire to only share a portion of a user's data with certain users, etc. Unfortunately, accomplishing the foregoing may be further complicated if different user data is stored in different physical locations.

Heretofore known efforts approach the issue of connecting different computer architectures together. Unfortunately, the result is complex protocols or procedures for exchanging information about interfaces. A fresh approach to sharing data, on the other hand, could greatly enhance users' and organizations' abilities to work together.

BRIEF SUMMARY

In accordance with embodiments, there are provided mechanisms and methods for sharing data among subscribers of a multi-tenant database (or other) service. These mechanisms and methods for sharing data among subscribers of a multi-tenant database service can enable embodiments to providing controlled, limited or full sharing between the subscribers regardless of the physical location of the subscriber data. The ability of embodiments to provide such sharing capabilities may lead to more secure sharing of data within a multi-tenant on-demand database service.

In an embodiment and by way of example, a method is provided for sharing data among subscribers of a multi-tenant database service. In use, a request is communicated to share data of a first subscriber of an on-demand database service with at least one second subscriber of the on-demand database service. It is also determined whether the request is actually from the first subscriber, as well as whether the request is accepted by the at least one second subscriber. To this end, sharing of the data of the first subscriber with the at least one second subscriber may be enabled, if the request is determined to be actually from the first subscriber and the request is accepted by the at least one second subscriber.

While the present invention is described with reference to an embodiment in which techniques for sharing data among subscribers of a multi-tenant database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 3A shows a graphical user interface (GUI) for generating an invitation, in accordance with one embodiment.

FIG. 3C shows a GUI illustrating objects and fields to be published, in accordance with one embodiment.

FIG. 3D shows a GUI for enabling an entity to subscribe to the published objects and fields, in accordance with one embodiment.

FIG. 3E shows a record that may be shared between entities, in accordance with one embodiment.

FIG. 3F shows a GUI for enabling an entity to accept a copy of a shared record, in accordance with one embodiment.

DETAILED DESCRIPTION

General Overview

Systems and methods are provided for sharing data among subscribers of a multi-tenant database service. While described with reference to multi-tenant database services, the systems and methods provided herein may be applied to other types of on-demand services in, including without limitation social networking sites, online shopping sites, online application software and so forth.

Any attempt to share data in a secure manner is often complicated by limitations of systems that are not able limit sharing to only a portion of a various data with certain users, etc. Thus, mechanisms and methods are provided herein for more securely sharing data among subscribers of a multi-tenant database service can enable embodiments to promote more control over the sharing process. The ability of embodiments to provide such additional control may lead to more secure sharing in the context of a multi-tenant on-demand database service.

Next, mechanisms and methods for sharing data among subscribers of a multi-tenant database service will be described with reference to exemplary embodiments.

Figure 1:
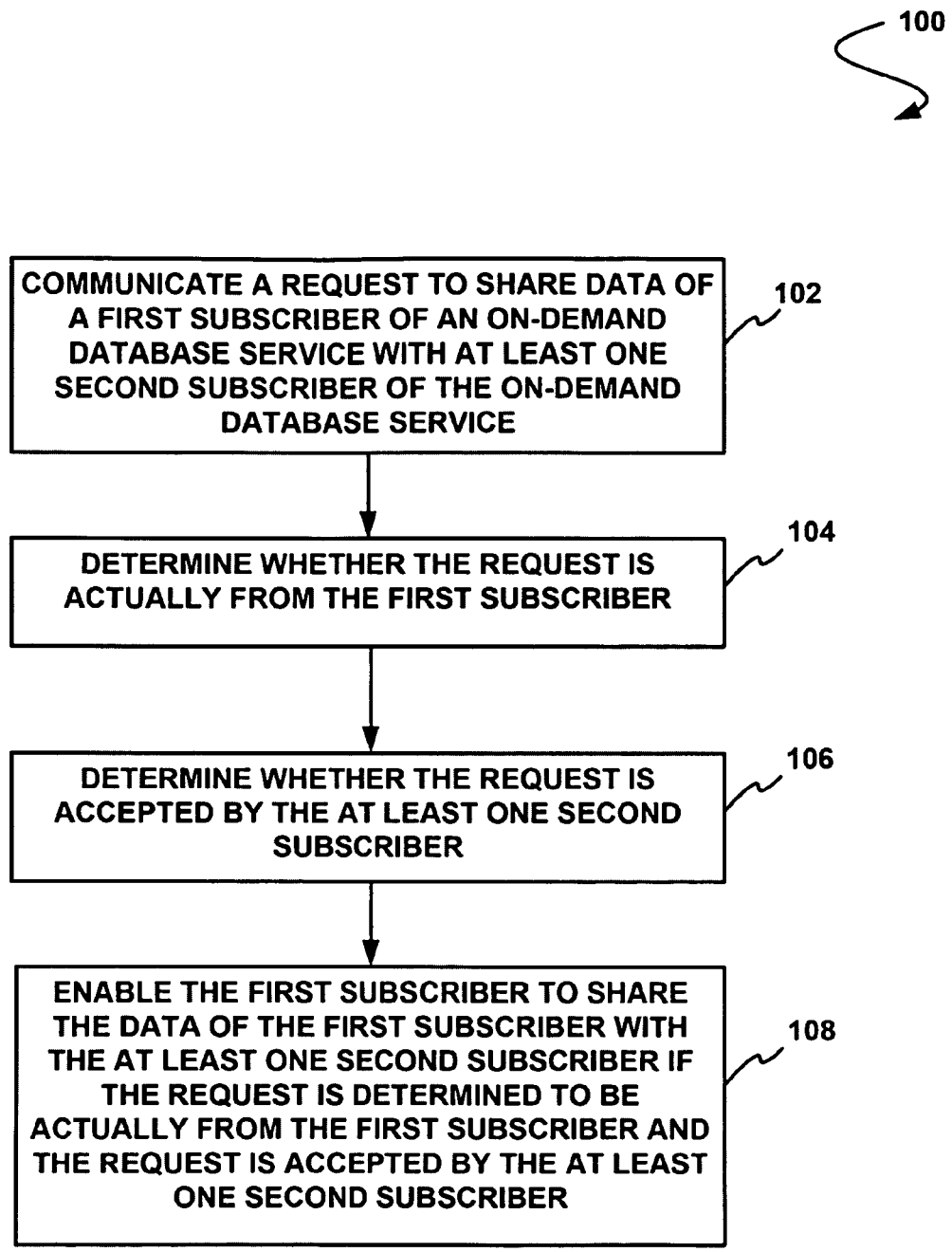
FIG. 1 illustrates a method for sharing data among subscribers of an on-demand database service, in accordance with one embodiment.

FIG. 1 illustrates a method 100 for sharing data among subscribers of an on-demand database service, in accordance with one embodiment. As shown, a request to share data of a first subscriber of an on-demand database service is communicated with a second subscriber of the on-demand database service. See operation 102. In this case, the second subscriber may refer to one subscriber or a plurality of subscribers.

Additionally, in the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more subscribers. For instance, a given application server may simultaneously process requests for a great number of subscribers, and a given database table may store rows for a potentially much greater number of subscribers. In this case, a subscriber refers to any entity (e.g. business, individual, etc.) that has subscribed or is otherwise authorized to use an on-demand database.

Furthermore, in the context of the present description, data refers to any data capable of being shared between one or more subscribers. For example, in various embodiments, the data may include, but is not limited to, files, records, folders, and/or any other data the meets the above definition.

As shown further in FIG. 1, it is determined whether the request to share data is actually from the first subscriber. See operation 104. In one embodiment, it may be determined whether the request is actually from the first subscriber by authenticating the first subscriber. In various embodiments, the authenticating may include verifying a unique user identification (ID) and/or password, verifying a unique key associated with the request, verifying an organization ID, and any other authentication technique.

Additionally, it is determined whether the request is accepted by the second subscriber. See operation 106. In one embodiment, the request may be communicated by the first subscriber by sending an electronic message to the second subscriber. In this case, the request may be accepted by the second subscriber utilizing the electronic message. For example, the request may be accepted by selecting a link in the electronic message. It should be noted that the electronic message may be any type of electronic message, such as an email, a text message, an instant message, etc.

Furthermore, the first subscriber is enabled to share the data of the first subscriber with the second subscriber if the request is determined to be actually from the first subscriber and the request is accepted by the second subscriber. See operation 108. As an option, different data of the first subscriber may be shared with different other subscribers. Thus, the first subscriber may share a first record with the second subscriber and share a second different record with a third subscriber.

In one embodiment, the sharing of the data of the first subscriber with the second subscriber may be enabled by the first subscriber publishing the data. In this case, the first subscriber may publish the data by selecting the data utilizing a graphical user interface.

In another embodiment, the sharing of the data of the first subscriber with the second subscriber may be enabled by the second subscriber subscribing to at least a portion of the data. In this case, the second subscriber may subscribe to the data by selecting at least a portion of the data utilizing a graphical user interface. As an option, the second subscriber may subscribe only to a subset of the data.

Furthermore, after the publishing and the sharing, a portion of the data may be communicated from the first subscriber to the second subscriber. As a result, the portion of the data is capable of being accepted by the second subscriber.

In still another embodiment, the data may be shared between the first subscriber and the second subscriber automatically based on at least one rule. In this case, the at least one rule may define related data that is automatically shared. As another option, the sharing of the data of the first subscriber with the second subscriber may be enabled by synchronizing the data. In some cases, the synchronizing may include updating the data.

Figure 2:
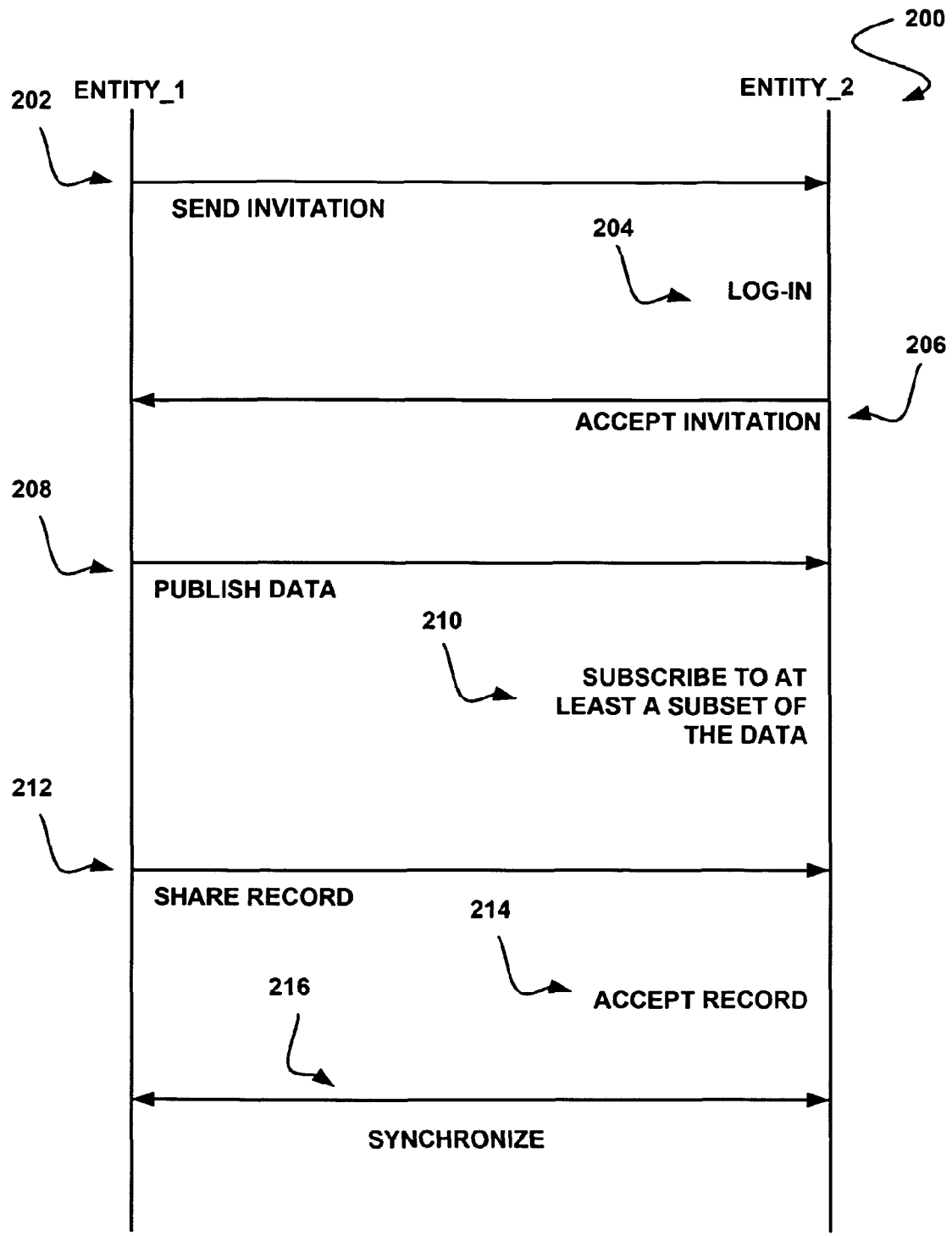
FIG. 2 shows a method for sharing data among subscribers of an on-demand database service, in accordance with another embodiment.

FIG. 2 shows a method 200 for sharing data among subscribers of an on-demand database service, in accordance with another embodiment. As an option, the present method 200 may be implemented in the context of the functionality of FIG. 1. Of course, however, the method 200 may be carried out in any desired environment. The aforementioned definitions may apply during the present description.

As shown, two entities that wish to share data may engage in a handshake process to establish a connection with each other. Once the connection is established, transferring of data between the two entities may be accomplished utilizing an application programming interface (API).

In operation, a first entity may invite a second entity that is a contact with a valid email address to be a partner. See operation 202. In this case, an entity refers to any individual, company, or organization. For example, the first and second entity may be two different companies or two different organizations within one company. FIG. 3A shows a graphical user interface (GUI) 300 for generating an invitation, in accordance with one embodiment.

One the invitation is sent by the first entity, it is verified that the first entity sent the invitation. In one embodiment, the invitation may include an ID that is unique to the first entity, such as an organization ID and/or a user ID. As an option, the invitation may be sent in an email to the second entity.

Figure 3B:
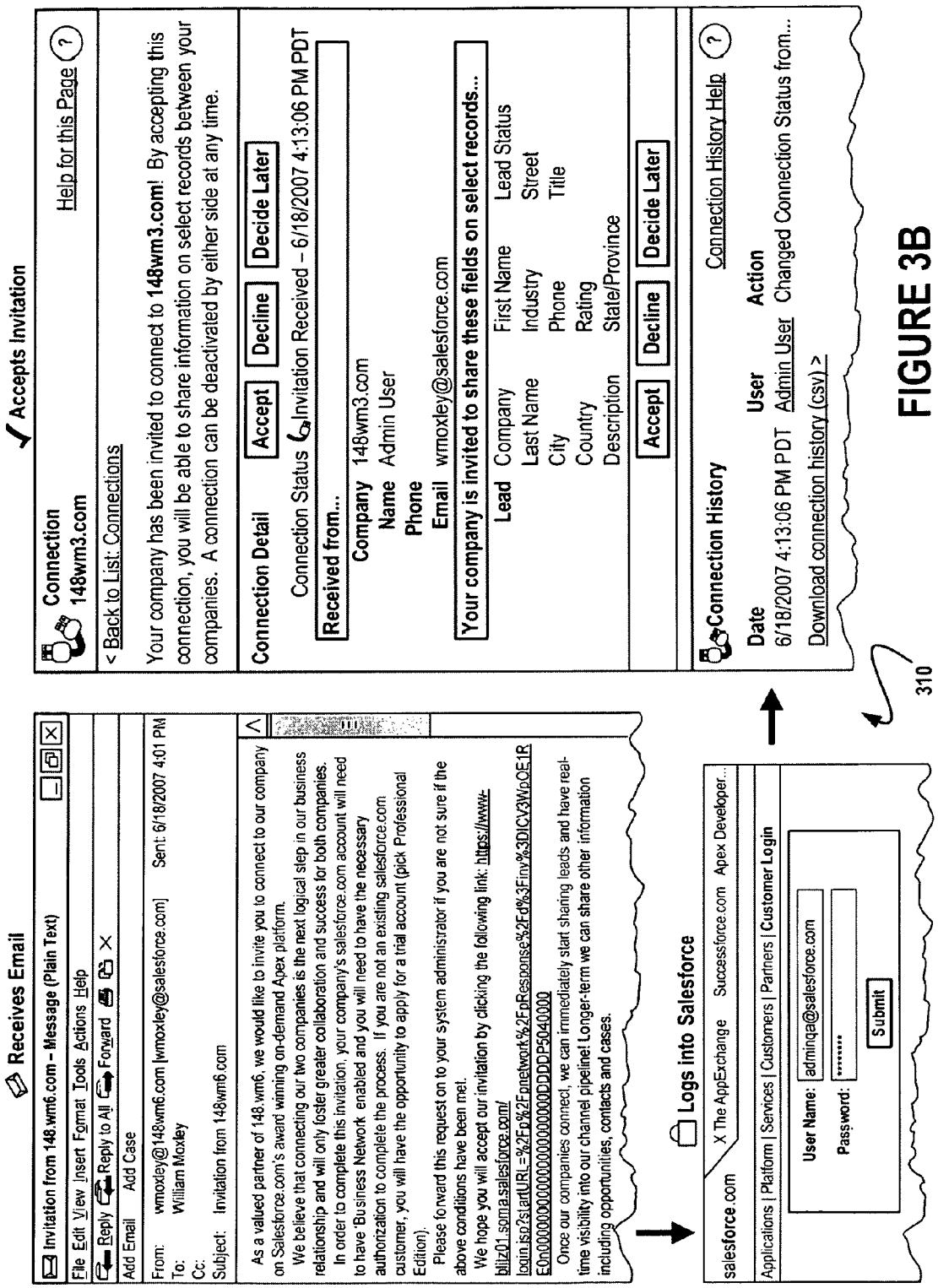
FIG. 3B illustrates a sequence of events encountered by an entity when accepting an invitation, in accordance with one embodiment.

The second entity may then perform a log-in and determine whether to accept the invitation from the first entity. See operation 204 of FIG. 2. If the second entity accepts the invitation, the first entity is notified of the acceptance. See operation 206. FIG. 3B illustrates a sequence of events encountered by an entity when accepting an invitation, in accordance with one embodiment. As shown, a GUI 310 may be presented to a user that allows the user to accept the invitation, decline the invitation, or defer the decision to a later time.

In one embodiment, if the invitation is accepted, data may be written into a connection table, which is accessible to both the first and the second entity, indicating the acceptance of the invitation and the established connection. In various embodiments, the connection table may be one table accessible to multiple entities or more than one table, where each table is associated with, and assessable to, one of the entities. The connection table may be used to store login or security information for the entities involved in the connection. Thus, each entity may have access to an organization ID and/or unique key and the user ID of the entity or point person on the other side of the connection.

Table 1 shows fields for a data structure representing a connection table, in accordance with one embodiment.

TABLE 1

| Field | Type | Note |
|---|---|---|
| ORGANIZATION_ID | CHAR(15 BYTE) | NOT NULL |
| PARTNER_NETWORK_CONNECTION_ID | CHAR(15 BYTE) | NOT NULL |
| CONNECTION_STATUS | CHAR(1 BYTE) | NOT NULL |
| USERS_ID | CHAR(15 BYTE) | NOT NULL |
| PARTNER_ORGANIZATION_ID | CHAR(15 BYTE) | |
| PARTNER_CONNECTION_ID | CHAR(15 BYTE) | |
| PARTNER_USERS_ID | CHAR(15 BYTE) | |
| CONTACT_ID | CHAR(15 BYTE) | NOT NULL |
| ACCOUNT_ID | CHAR(15 BYTE) | NOT NULL |
| RESPONSE_DATE | DATE | |
| CREATED_DATE | DATE | DEFAULT SYSDATE |
| CREATED_BY | CHAR(15 BYTE) | NOT NULL |
| LAST_UPDATE | DATE | DEFAULT SYSDATE |
| LAST_UPDATE_BY | CHAR(15 BYTE) | NOT NULL |
| NAME | VARCHAR2(765 BYTE) | |

Additionally, a field mapping table may be utilized to store a field to field mapping for each connection. This field mapping table may be utilized to specify outbound fields each entity is willing to share and any mapping for inbound fields. As an option, the unique ID of the entity (e.g. the organization ID) may be used to correlate information in the mapping table to a particular entity. Thus, the second entity only needs the unique ID of the first entity to determine the physical instance of the database where the data associated with the first entity resides. Furthermore, by using this unique ID, an API endpoint, which may be used for all synchronization operations, may be determined.

Table 2 shows fields for a data structure representing a field mapping data table, in accordance with one embodiment.

TABLE 2

| Field | Type | Note |
|---|---|---|
| ORGANIZATION_ID | CHAR(15 BYTE) | NOT NULL |
| PARTNER_NETWORK_FIELD_MAP_ID | CHAR(15 BYTE) | NOT NULL |
| CONNECTION_ID | CHAR(15 BYTE) | NOT NULL |
| TABLE_ENUM_OR_ID | VARCHAR2(120 BYTE) | NOT NULL |
| COLUMN_ENUM_OR_ID | VARCHAR2(120 BYTE) | |
| PARTNER_COLUMN_NAME | VARCHAR2(765 BYTE) | |
| IS_SHARED | CHAR(1 BYTE) | NOT NULL |
| PARTNER_TABLE_NAME | VARCHAR2(765 BYTE) | |
| PARTNER_FIELD_MAP_ID | CHAR(15 BYTE) | |
| DATA_COLUMN | NUMBER | |

Once the invitation has been accepted by the second entity, the first entity publishes data. See operation 208 of FIG. 2. In this case, the publishing may include publishing data objects and fields that the first entity desires to share with the second entity. FIG. 3C shows a GUI 320 illustrating objects and fields to be published, in accordance with one embodiment.

In one embodiment, transferring the data to be published to an entity (e.g. the second entity) may be accomplished utilizing a queue. In this case, multiple valid connections to multiple records may be added to these queues. The sharing of records and record information may also be possible utilizing an explicit share to connection link on records that are not stored by the queues.

Table 3 shows fields for a data structure representing a queue, in accordance with one embodiment.

TABLE 3

| Field | Type | Note |
|---|---|---|
| ORGANIZATION_ID | CHAR(15 BYTE) | NOT NULL |
| RECORD_ID | CHAR(15 BYTE) | NOT NULL |
| EVENT_TYPE_ENUM | NUMBER | NOT NULL |
| CREATED_DATE | DATE | DEFAULT SYSDATE |
| CONNECTION_ID | CHAR(15 BYTE) | NOT NULL |
| DEQUEUE_DATE | DATE | NOT NULL |
| RETRIES | NUMBER | NOT NULL |

Figure 3D:
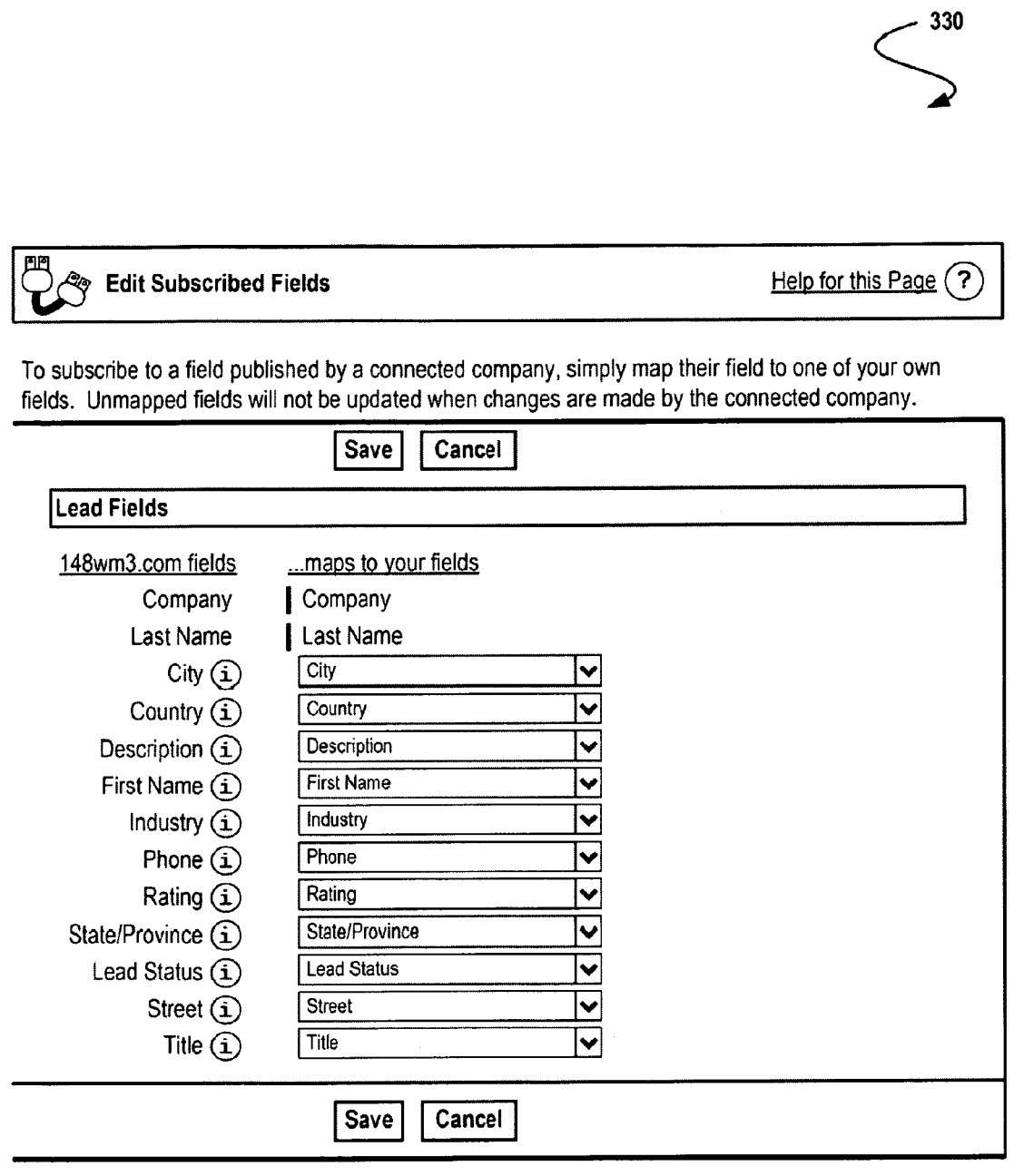

Once the data is published, the second entity may subscribe to all or a subset of the published data. See operation 210 of FIG. 2. FIG. 3D shows a GUI 330 for enabling an entity to subscribe to the published objects and fields, in accordance with one embodiment.

Figure 3E:
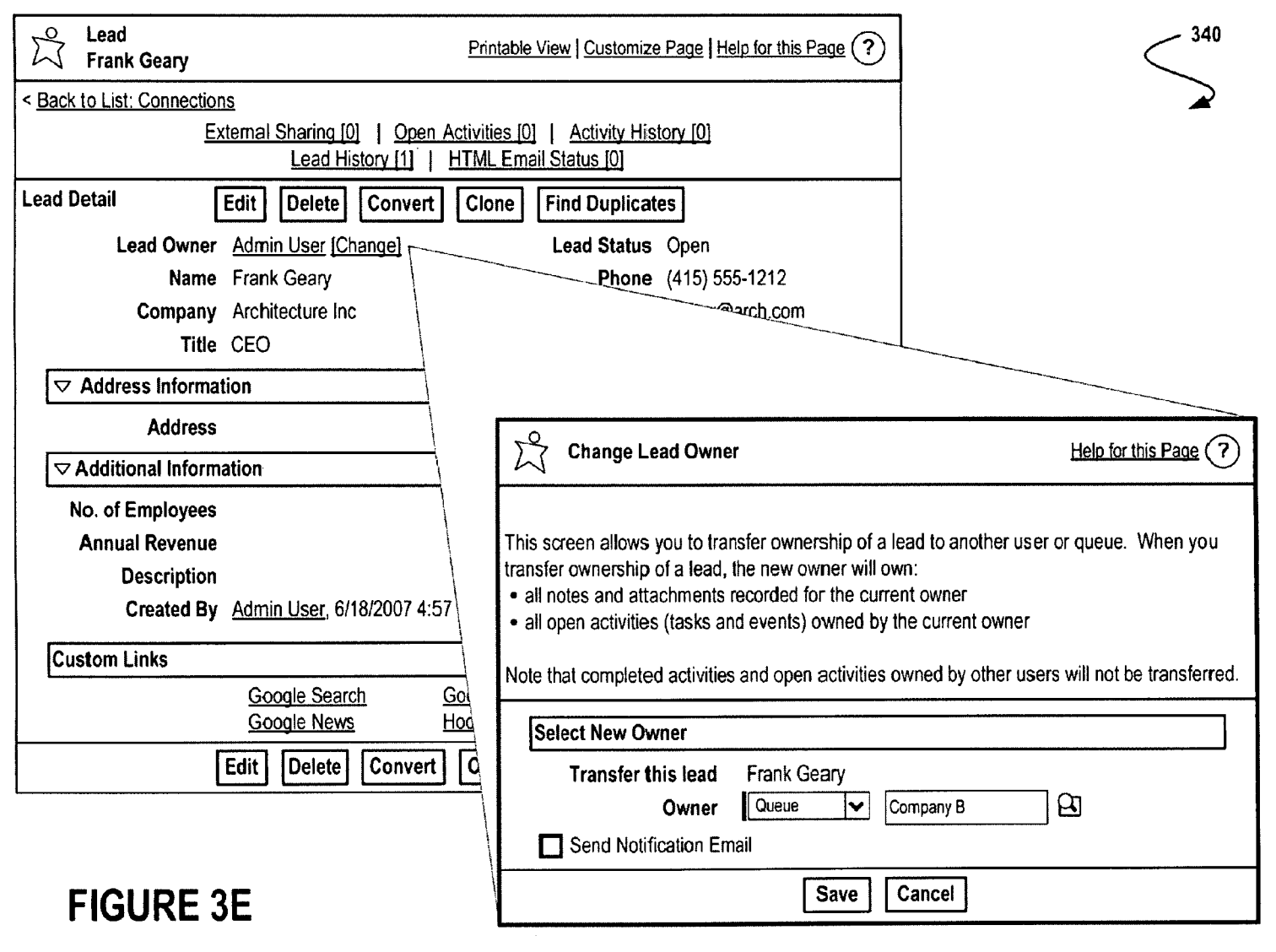

The first entity may then share the data to which the second entity has subscribed, such as a record, with the second entity. See operation 212 of FIG. 2. FIG. 3E shows a record 340 that may be shared between entities, in accordance with one embodiment.

In the case that a shared record is assigned to a queue that contains one or more connections, a subset of the record fields may be transferred (e.g. as text) to all other connected entities in the queue and placed in a staging table. List views may then be implemented on the staging table and specific views assigned to any appropriate individuals (e.g. sales people, etc.), based on the staged data.

Table 4 shows fields for a data structure representing a staging table for a record, in accordance with one embodiment.

TABLE 4

| Field | Type | Note |
|---|---|---|
| ORGANIZATION_ID | CHAR(15 BYTE) | NOT NULL |
| PARTNER_NETWORK_RECORD_STAGE_ID | CHAR(15 BYTE) | NOT NULL |
| PARTNER_RECORD_ID | CHAR(15 BYTE) | NOT NULL |
| CONNECTION_ID | CHAR(15 BYTE) | NOT NULL |
| SENT_DATE | DATE | DEFAULT NULL |
| SOURCE | VARCHAR2(765 BYTE) | |
| COMPANY | VARCHAR2(765 BYTE) | |
| INDUSTRY | VARCHAR2(765 BYTE) | |
| STATE | VARCHAR2(60 BYTE) | |
| TITLE | VARCHAR2(240 BYTE) | |
| FIRST_NAME | VARCHAR2(120 BYTE) | |
| LAST_NAME | VARCHAR2(240 BYTE) | |
| PHONE | VARCHAR2(120 BYTE) | |
| EMAIL | VARCHAR2(240 BYTE) | |
| STATUS | VARCHAR2(765 BYTE) | |

Table 5 shows fields for a data structure representing a staging table for custom objects, in accordance with one embodiment.

TABLE 5

| Field | Type | Note |
|---|---|---|
| ORGANIZATION_ID | CHAR(15 BYTE) | NOT NULL |
| PARTNER_NETWORK_STAGE_ID | CHAR(15 BYTE) | NOT NULL |
| PARTNER_RECORD_ID | CHAR(15 BYTE) | NOT NULL |
| CONNECTION_ID | CHAR(15 BYTE) | NOT NULL |
| SENT_DATE | DATE | NOT NULL |
| TABLE_ENUM_OR_ID | VARCHAR2(120 BYTE) | NOT NULL |
| CURRENCY_ISO_CODE | CHAR(3 BYTE) | NOT NULL |
| VAL0 | VARCHAR2(765 BYTE) | |
| VAL1 | VARCHAR2(765 BYTE) | |
| VAL2 | VARCHAR2(765 BYTE) | |
| VAL3 | VARCHAR2(765 BYTE) | |
| VAL4 | VARCHAR2(765 BYTE) | |
| VAL5 | VARCHAR2(765 BYTE) | |
| VAL6 | VARCHAR2(765 BYTE) | |
| VAL7 | VARCHAR2(765 BYTE) | |
| VAL8 | VARCHAR2(765 BYTE) | |

TABLE 5-continued

| Field | Type | Note |
|---|---|---|
| VAL9 | VARCHAR2(765 BYTE) | |
| VAL10 | VARCHAR2(765 BYTE) | |

Once the record is placed in the staging table, the second entity may accept the record. See operation 214 of FIG. 2. FIG. 3F shows a GUI 350 for enabling an entity to accept a copy of a shared record, in accordance with one embodiment.

Once the second entity accepts the staged record, a valid record may be created from the data in the staged table. In some cases, acceptance may be a real time operation where the first connection (or internal user) to accept a record is the first to establish access to that record.

Figure 3G:
FIG. 3G shows a GUI for enabling an entity to synchronize data, in accordance with one embodiment.

Any time a record that is shared to an entity is updated, the record may be added to a synchronization queue to be processed by a batch process such that data synchronization may take place. See operation 216. A source object may be read and, based on the field mapping table, the fields being shared may be extracted. The field mapping table of the second organization may then be read and the appropriate record update call may be made. FIG. 3G shows a GUI 360 for enabling an entity to synchronize data, in accordance with one embodiment.

As an option, failed calls may be limited (e.g. to five times at most, etc.). As another option, the time between calls may increase (e.g. by a power of 2, etc.). Additionally, a valid session ID may be communicated to the first or second entity using the connection established for the record update call. In one embodiment, every record update may be tracked in an audit trail with the connection history.

Figure 4:
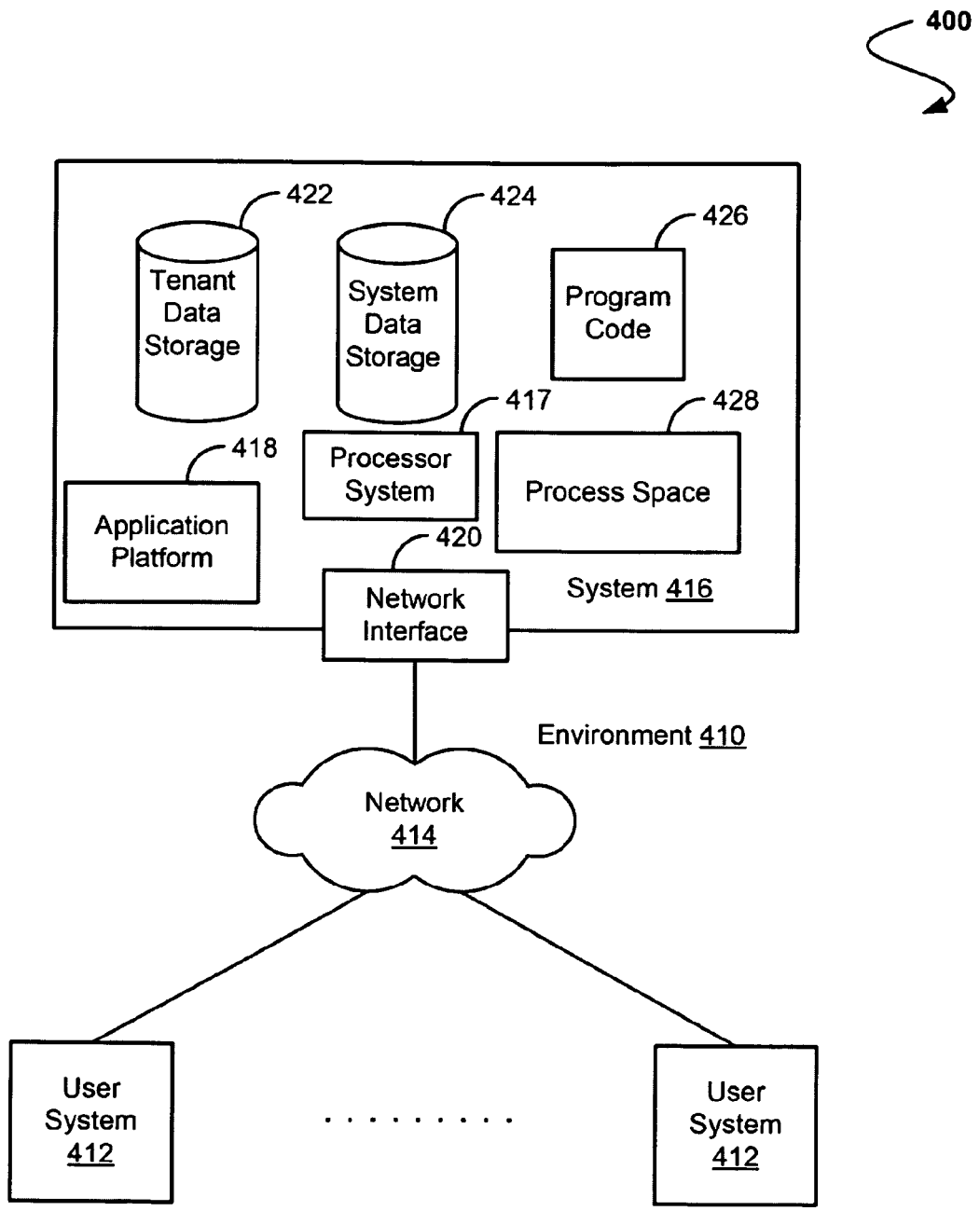
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
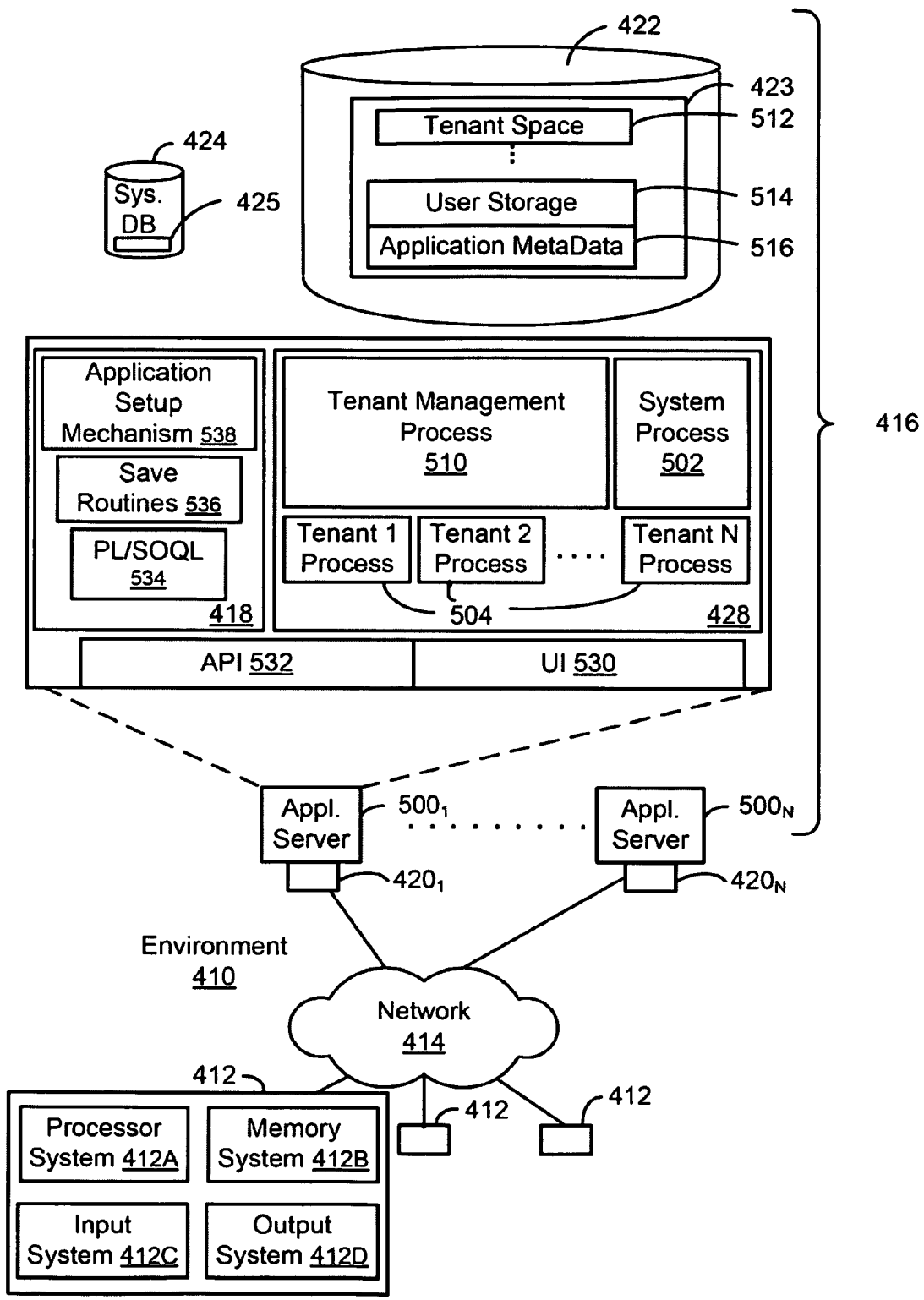
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUT pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828, 192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate.

Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for sharing of a first tenant's data objects with a second tenant, the first and second tenants using logically distinct parts of a shared multi-tenant database, the method including:
   receiving from a first tenant an offer to establish a connection and share data with a second tenant, wherein first data objects are stored in the first tenant's logical part of the multi-tenant database system;
   receiving from the second tenant an acceptance of the connection with the first tenant;
   recording the connection between the first tenant and the second tenant and publishing the first data objects to the second tenant for subscription;
   receiving from the second tenant a subscription to at least a subset of the first data objects; and
   copying the subscribed first data objects into subscribed second data objects in the second tenant's logical part of the shared multi-tenant database, responsive to the subscription.

2. The method of claim 1, wherein the offer is communicated by the first tenant by sending an electronic message to the second tenant.

3. The method of claim 2, wherein the offer is accepted by the second tenant utilizing the electronic message.

4. The method of claim 3, wherein the offer is accepted by the second tenant by selecting a link in the electronic message.

5. The method of claim 1, wherein it is determined whether the offer is actually from the first tenant by authenticating the first tenant.

6. The method of claim 1, wherein different data of the first tenant is shared with different other tenants.

7. The method of claim 1, wherein the sharing of the data of the first tenant with the second tenant is enabled by the first tenant publishing the data.

8. The method of claim 7, wherein the first tenant publishes the data by selecting the data utilizing a graphical user interface.

9. The method of claim 7, wherein the sharing of the data of the first tenant with the second tenant is enabled by the at least one second tenant subscribing to at least a portion of the data.

10. The method of claim 9, wherein the at least one second tenant subscribes to the data by selecting the at least a portion of the data utilizing a graphical user interface.

11. The method of claim 9, wherein the second tenant subscribes only to a subset of the data.

12. The method of claim 1, wherein the data is shared between the first tenant and the second tenant automatically based on at least one rule.

13. The method of claim 12, wherein the at least one rule defines related data that is automatically shared.

14. The method of claim 1, wherein the sharing of the data of the first tenant with the second tenant is enabled by synchronizing the data.

15. The method of claim 1, further comprising in response to a determination that the request is accepted by the at least one second subscriber, writing an indication of the acceptance of the request and an established connection to a connection table accessible to the first subscriber and the at least one second subscriber, wherein the connection table stores security information for the first subscriber and the at least one second subscriber for access by both of the first subscriber and the at least one second subscriber.

16. The method of claim 1, further including:
   monitoring updates to at least the subscribed first data objects; and copying updates to the subscribed first data objects into the subscribed second data objects.

17. The method of claim 1, wherein the multi-tenant database is an on-demand database.

18. The method of claim 17, further including the on-demand database storing the first data objects and the second data objects single multi-tenant physical table.

19. A non-transitory machine-readable storage medium carrying one or more sequences of instructions which, when executed by one or more processors, cause the one or more processors to carry out the steps of:
receiving from a first tenant an offer to establish a connection and share data with a second tenant, wherein first data objects are stored in the first tenant's logical part of the multi-tenant database system;
receiving from the second tenant an acceptance of the connection with the first tenant;
recording the connection between the first tenant and the second tenant and publishing the first data objects to the second tenant for subscription;
receiving from the second tenant a subscription to at least a subset of the first data objects; and
copying the subscribed first data objects into subscribed second data objects in the second tenant's logical part of the shared multi-tenant database, responsive to the subscription.

20. The non-transitory machine-readable storage medium of claim 19, further including:
monitoring updates to at least the subscribed first data objects; and
copying updates to the subscribed first data objects into the subscribed second data objects.

21. The non-transitory machine-readable storage medium of claim 19, wherein the multi-tenant database is an on-demand database.

22. The non-transitory machine-readable storage medium of claim 21, further including the on-demand database storing the first data objects and the second data objects in a single multi-tenant physical table.

23. An apparatus, comprising:
a processor; and
one or more stored sequences of instructions which, when executed by the processor, cause the processor to carry out the steps of:
receiving from a first tenant an offer to establish a connection and share data with a second tenant, wherein first data objects are stored in the first tenant's logical part of the multi-tenant database system;
receiving from the second tenant an acceptance of the connection with the first tenant;
recording the connection between the first tenant and the second tenant and publishing the first data objects to the second tenant for subscription;
receiving from the second tenant a subscription to at least a subset of the first data objects; and
copying the subscribed first data objects into subscribed second data objects in the second tenant's logical part of the shared multi-tenant database, responsive to the subscription.

24. The apparatus of claim 23, further including:
monitoring updates to at least the subscribed first data objects; and
copying updates to the subscribed first data objects into the subscribed second data objects.

25. The apparatus of claim 23, wherein the multi-tenant database is an on-demand database.

26. The apparatus of claim 25, further including the on-demand database storing the first data objects and the second data objects single multi-tenant physical table.

* * * * *